United States Patent [19]

Hibino et al.

[11] Patent Number: 5,853,690
[45] Date of Patent: *Dec. 29, 1998

[54] METHOD FOR DECOMPOSING WATER USING AN ACTIVATED CARBON CATALYST

[75] Inventors: Kouetsu Hibino, Susono; Kyoichi Tange, Mishima, both of Japan

[73] Assignee: Toyota Jidosha Kabushiki Kaisha, Toyota, Japan

[ * ] Notice: This patent issued on a continued prosecution application filed under 37 CFR 1.53(d), and is subject to the twenty year patent term provisions of 35 U.S.C. 154(a)(2).

[ * ] Notice: The term of this patent shall not extend beyond the expiration date of Pat. No. 5,709,791.

[21] Appl. No.: 805,338

[22] Filed: Feb. 24, 1997

[30] Foreign Application Priority Data

Feb. 28, 1996 [JP] Japan ................................ 8-041674

[51] Int. Cl.$^6$ ................ C01B 7/19; C01B 7/01; B01J 21/18
[52] U.S. Cl. ............ 423/483; 423/481; 423/486; 502/416; 502/417; 502/184; 502/185
[58] Field of Search .................. 502/416, 417, 502/184, 185; 423/481, 483, 486

[56] References Cited

U.S. PATENT DOCUMENTS

| 5,346,876 | 9/1994 | Ichimura et al. | 502/417 |
| 5,482,906 | 1/1996 | Sakai et al. | 502/417 |
| 5,709,791 | 1/1998 | Hibino et al. | 423/483 |

FOREIGN PATENT DOCUMENTS 4-285006  10/1992  Japan ............... C01B 31/08

*Primary Examiner*—Glenn Caldarola
*Assistant Examiner*—In Suk Bullock
*Attorney, Agent, or Firm*—Finnegan, Henderson, Farabow, Garrett & Dunner, L.L.P.

[57] ABSTRACT

Activated carbon is effective as a catalyst for water decomposition when it is coated with a heat-resistant, oxidation-resistant film. The heat-resistant, oxidation-resistant film is formed from an inorganic material such as ceramic or metal, and/or an organic material such as an organic ion-exchange resin, a silicone resin or a fluororesin, and preferably contains oxide capable of decomposing hypohalogenous acid. Water can be chemically decomposed to give hydrogen by the use of the activated carbon.

10 Claims, 2 Drawing Sheets

METHOD FOR DECOMPOSING WATER USING AN ACTIVATED CARBON CATALYST

BACKGROUND OF THE INVENTION

1. Field of the Invention

The present invention relates to activated carbon. Specifically, the present invention relates to highly durable activated carbon effective as a catalyst for water decomposition.

2. Description of the Related Art

Global warming caused by trace gases in the atmosphere, particularly by carbon dioxide, has received considerable attention as an environmental problem in recent years. That is, as the concentration of carbon dioxide in the air increases, the amount of those infrared rays which are emitted from the earth's surface, absorbed by the atmosphere and returned thereto increases. As a result, the temperature of the earth's surface rises. Fossil fuel, which is used as an energy source, inevitably generates carbon dioxide when burnt. A variety of alternative clean energy sources for suppressing carbon dioxide generation have, therefore, been proposed. Among them, hydrogen inherently contains no carbon, and, therefore, generates no carbon dioxide. Moreover, hydrogen forms water again after energy conversion, and, therefore, receives attention as a reproducible clean energy source.

At present, ninety-nine percent of hydrogen is produced from fossil fuels as a raw material. Hydrogen is produced, for example, from naphtha by a steam reform process, and from coal through a water gas formation reaction. These methods, however, have the following disadvantages: since fossil fuel is used as a raw material, carbon dioxide is generated; these methods consume a large amount of power and; these methods may deplete the fossil fuel resources. A process for producing hydrogen by electrochemically decomposing water without using such fossil fuel is being industrially established. The process, however, has a disadvantage related to cost, etc. because the process also consumes a large amount of power, and has a problem that the power consumption must be lowered.

To solve these problems, various processes for chemically decomposing water through multistage reactions have been proposed. That is, as represented by the following formula:

$$H_2O + X_2 \rightarrow HX + HXO \quad (1)$$

wherein X is halogen, a process comprising reacting water with halogen while activated carbon is used as a catalyst to form hydrogen halide, and electrolyzing hydrogen halide thus obtained to form hydrogen has been proposed. The process has an advantage that hydrogen can be formed at a very low potential and the electric energy consumption can be decreased compared with direct electrolysis of water.

Since hypohalogenous acid, HXO, formed in the reaction formula (1) is a strong oxidizing agent, it oxidizes activated carbon as shown by the following formula:

$$2HXO + C \rightarrow 2HX + CO_2 \quad (2)$$

Furthermore, hypohalogenous acid, HXO, formed in the formula (1) releases oxygen by the formula (3) shown below. The oxygen is adsorbed by activated carbon, becomes a free radical, and reacts with activated carbon to oxidize it.

$$2HXO \rightarrow 2HX + O_2 \quad (3)$$

$$C + O_2 \rightarrow CO_2$$

As described above, activated carbon as a catalyst is unavoidably deteriorated in the reactions mentioned above, and the process has a disadvantage that the reaction efficiency lowers. To prevent such a deterioration of activated carbon, a protective coating may be applied thereto. For example, Japanese Unexamined Patent Publication No. 4-285006 discloses that activated carbon is coated with a polyethylene or polypropylene film. The patent publication also discloses that the adsorbability of activated carbon, a function thereof, does not lower even when it is coated with such a film.

Hypohalogenous acid generated in the formula (1), however, is a strong oxidizing agent, and the polyethylene or polypropylene film is corroded. Moreover, although the reactions mentioned above are preferably conducted at a temperature as high as at least 140° C., polyethylene or polypropylene is not sufficiently heat-resistant to endure the high temperature. Accordingly, there is a problem that the activated carbon coated with a polyethylene or polypropylene film cannot be used in the reactions mentioned above.

SUMMARY OF THE INVENTION

An object of the present invention is to solve the problems as mentioned above and provide highly durable activated carbon which can be used in the reactions as mentioned above without lowering its catalytic activity.

The present invention relates to activated carbon which is coated with a heat-resistant, oxidation-resistant film.

DETAILED DESCRIPTION OF THE PREFERRED EMBODIMENT

Figure 1:
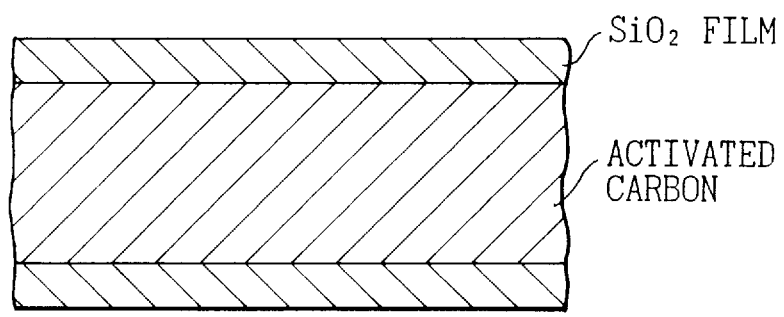
FIG. 1 is a cross-sectional view of activated carbon which is coated with a $SiO_2$ film.

The present invention provides highly durable activated carbon which is used as a catalyst for reactions as expressed by the formulas (1) and (2) in which water is reacted with halogen to be decomposed through two stages. The activated carbon suffers from oxidation action and is used at temperature as high as about 100° to 200° C. in the reactions. The activated carbon is, therefore, required to have oxidation resistance and heat resistance. To impart such oxidation resistance and heat resistance to the activated carbon, a heat-resistant, oxidation-resistant film is formed thereon.

There is no limitation on the activated carbon to be used in the present invention. Activated carbon of any type can be used so long as it functions as a catalyst. A carbonized product of wood or coconut shells, or coal is used as a raw material for activated carbon. The raw material is carbonized at high temperature, and then the carbonized product is activated with gas or chemicals to give activated carbon. The activated carbon to be used in the present invention may have any form, such as a powder form, a granular form or a fibrous form.

The film formed on the activated carbon is required to have oxidation resistance and heat resistance. Various organic materials and inorganic materials may be used as materials for forming the film so long as the materials give an oxidation-resistant, heat-resistant film. Examples of the inorganic materials are ceramic and metal. Any ceramic may be used without a problem with regard to heat resistance and oxidation resistance. Examples of the metal are Ti, Zr, Nb, Ta, Cr, Mo, Pt, Au, Ir, Ru, Rh and alloys of these metals. Examples of the organic materials are a fluororesin such as polytetrafluoroethylene (Teflon), polyethylenepropylene fluoride and polyvinylidene fluoride; silicone resin; ion-exchange resin such as Nafion (trade name of Du Pont de Nemours) and CEC Film (trade name of Chloringeneering Co.), and the like.

The film formed on the activated carbon may be either a single layer formed from only one of these materials or a multilayer structure formed from at least two different materials. That is, a film of an inorganic material may be first formed on the activated carbon, and then a film of an organic material may be formed thereon, and vice versa. Moreover, a single film layer may be formed from at least two materials.

There is no specific limitation on the method for forming the film from the above-mentioned materials on the activated carbon, and the method may suitably be selected in accordance with the material to be used. For example, a ceramic film may be formed by vacuum deposition, ion plating, sputtering, chemical vapor deposition (CVD), chemical vapor transfer (CVT), a sol-gel method, or a like method. A metal film may be formed by vacuum vapor deposition, ion plating, sputtering, chemical vapor deposition, plating, or a like method. An organic film may be formed by impregnating, spraying, electrostatic coating, electrodeposition, or a like method.

As described above, since the activated carbon is attacked by hypohalogenous acid formed by the reaction mentioned above and oxidized, an oxide capable of decomposing hypohalogenous acid is preferably mixed in the coating film. Examples of the oxide are manganese oxide such as MnO, $MnO_2$ and $Mn_2O_3$, iron oxide such as FeO, $FeO_2$, $Fe_2O_3$ and $Fe_3O_4$, copper oxide such as CuO, cobalt oxide such as $CO_3O_4$, nickel oxide such as NiO and tungsten oxide such as $WO_2$ and $WO_3$. These compounds may be used singly or in a mixture of at least two of them. These oxides not only decompose hypohalogenous acid but also promote the decomposition reactions of water as shown in the above formulas. These oxides are mixed in a film-forming material, and the film is formed by a method as mentioned above, whereby the oxide is contained therein.

Although activated carbon is hydrophobic, it is not strongly hydrophobic. There are methods for lowering the hydrophobicity such as treatment of the activated carbon with nitric acid. However, an excellent method for increasing the hydrophobicity is not known. Highly hydrophobic activated carbon having water repellence is effective in some applications, for example, in the gas diffusion layer of gas diffusion electrodes of fuel cells. To enhance the hydrophobicity of the activated carbon, a substance for imparting water repellence to a film-forming material, such as a fluoride compound, is added thereto, and the film is formed, whereby a film having water repellence is formed. One of examples of the fluoride compound is FAS ($CF_3(CF_2)_7CH_2CH_2Si(OCH_3)_3$).

Since the activated carbon is coated with a film of various materials, it is thought that the activated carbon may exhibit a lowered catalytic function. However, when the specific surface area of the activated carbon is measured before and after forming the film, it has been found that there is substantially no change therein, and that the activated carbon exhibits substantially no lowered catalytic function.

As described later, all the films which have been investigated herein are fairly dense, and it has been considered that the reactants, namely water and halogen, and products, namely hydrogen halide and gas ($CO_2$ and $O_2$) cannot permeate them. However, the reactions proceed in practice. Accordingly, it may be estimated that the reactions proceed because the reactants and the products permeate the resin film due to the high pressure on the film when a resin film is used. It may also be estimated that the reactions proceed because the reaction active surface of the activated carbon is transferred to the film surface when a metal or ceramic film is used, in addition to the above-mentioned reason.

EXAMPLE 1
Formation of a $SiO_2$ film by a sol-gel method

Tetraethyl orthosilicate in an amount of 10.0 g and ethyl alcohol in an amount of 13.27 g were mixed, and stirred for 2 hours. To the mixture, 4.25 g of pure water and 5.27 g of 1N HCl were further added, and the resultant mixture was stirred for 2 hours. The mixture was allowed to stand for 24 hours, and activated carbon fibers having a fiber diameter of 10 μm were immersed therein and pulled out. The activated carbon fibers were dried by allowing them to stand at 40° C. for 30 minutes, and baked at 200° C. for 1 hour. The following reactions proceeded in the process, and an $SiO_2$ film was formed on the activated carbon:

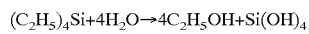

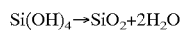

FIG. 1 shows the structure of the activated carbon thus formed. The thickness of the $SiO_2$ film thus formed was 300 nm. The specific surface area of the activated carbon before and after coating the activated carbon with a film was measured by a BET method to find that the activated carbon had a specific surface area of 1,200 $m^2/g$ before coating and 1,190 $m^2/g$ after coating. That is, the activated carbon exhibited substantially no change of the specific surface area. The $SiO_2$ film thus formed was magnified 15,000 times with an SEM, and observed to find that there were substantially no large pores, and that the film was dense.

EXAMPLE 2
Formation of Ti/Ni films by vacuum deposition

Figure 2:
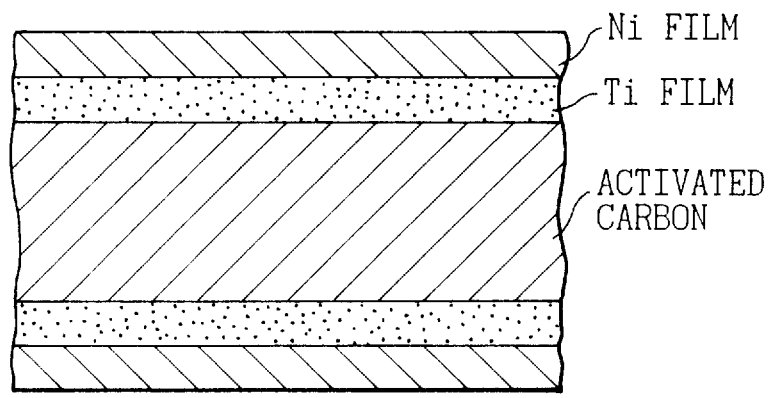
FIG. 2 is a cross-sectional view of activated carbon which is coated with a Ti film and a Ni film.

A Ti film having a thickness of 100 nm was formed on activated carbon fibers having a fiber diameter of 10 μm by vacuum deposition, and a Ni film having a thickness of 100 nm was formed on the Ti film similarly by vacuum deposition. FIG. 2 shows the structure of the activated carbon thus formed. The specific surface area of the activated carbon before and after coating the activated carbon with a film was measured by a BET method to find that the activated carbon had a specific surface area of 1,200 $m^2/g$ before coating and 1,190 $m^2/g$ after coating. That is, the activated carbon exhibited substantially no change of the specific surface area. The Ti/Ni films thus formed were magnified 15,000 times with an SEM, and observed to find that there were substantially no large pores, and that the film was dense.

EXAMPLE 3
Formation of an ion-exchange resin film

Figure 3:
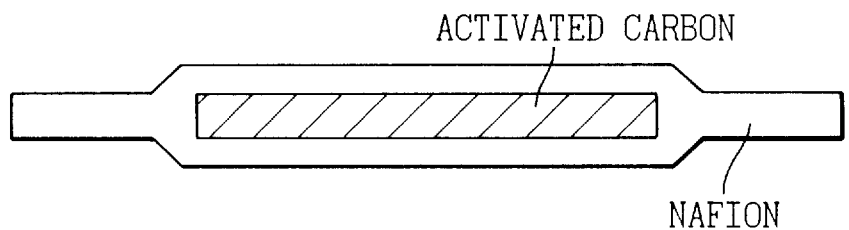
FIG. 3 is a cross-sectional view of activated carbon which is coated with an ion-exchange resin film.

A solution containing 5% of Nafion (manufactured by Du Pont de Nemours) was dropped on activated carbon fibers having a size of 5 cm×5 cm (fiber diameter: 10 μm), and the activated carbon fibers were dried at 80° C. for 1 hour. The activated carbon fibers were sandwiched between two sheets of Nafion 117 having a thickness of 125 μm, followed by hot pressing the sandwiched activated carbon fibers at a pressure of 50 kg/cm² at a temperature of 140° C. for 20 minutes. The solution of Nafion had been added prior to hot pressing because the addition increased the adhesion of the sheets of Nafion 117 thereto and prevented the peeling of the sheets during hot pressing. Activated carbon as shown in FIG. 3 was thus obtained.

EXAMPLE 4
Formation of a silicone resin film

Activated carbon fibers having a size of 5 cm×5 cm (fiber diameter: 10 μm) were coated with a primer, and then thinly coated with a silicone resin (tradename of KE3418, manufactured by Shinetsu Chemical Co., Ltd.). The resin coating was cured by allowing the coated activated carbon fibers to stand at room temperature for 7 days, and the film thickness was measured and found to be 10 μm.

EXAMPLE 5
Formation of a fluororesin film

Activated carbon fibers having a size of 5 cm×5 cm (fiber diameter: 10 μm) were coated with a primer, and then thinly coated with Teflon (code No. 958-303, manufactured by Du Pont de Nemours). The resin coating was cured by allowing the coated activated carbon fibers to stand at 345° C. for 15 minutes, and the film thickness was measured and found to be 10 μm.

EXAMPLE 6
Formation of $SiO_2$ film/ion-exchange resin film

First, an $SiO_2$ film having a thickness of 10 μm was formed on activated carbon fibers having a fiber diameter of 10 μm in the same manner as in Example 1. A film of Nafion having a thickness of 125 μm was formed thereon in the same manner as in Example 4.

Figure 4:
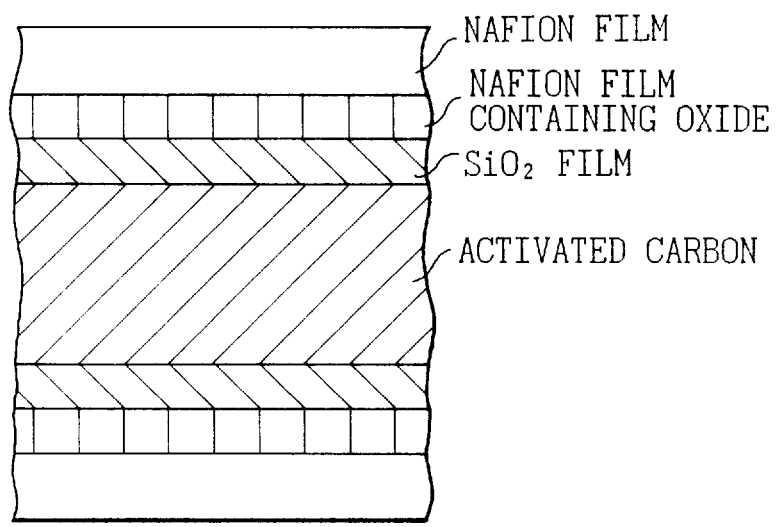
FIG. 4 is a cross-sectional view of activated carbon which is coated with a film containing oxide capable of decomposing hypohalogenous acid.

EXAMPLE 7
Formation of a film containing oxide capable of decomposing hypohalogenous acid First, a $SiO_2$ film having a thickness of 300 nm was formed on activated carbon fibers having a fiber diameter of 10 μm in the same manner as in Example 1. A 5% Nafion solution containing 20% by weight of CuO was dropped on the activated carbon fibers, which were then dried at 80° C. for 1 hour. The activated carbon fibers were sandwiched between two sheets of Nafion 117 in the same manner as in Example 3, followed by hot pressing the sandwiched activated carbon fibers at a pressure of 50 kg/cm² at a temperature of 140° C. for 20 minutes. FIG. 4 shows the activated carbon thus formed. The film thickness of Nafion in which the oxide was mixed was 30 nm, and that of Nafion was 125 μm.

Evaluation of the Activated Carbon Mentioned above in Water Decomposition

The activated carbon prepared in Examples 1 to 7 was used as catalysts for water decomposition in which water was reacted with bromine, and the durability was examined. The reaction is expressed by the following formula:

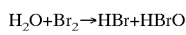

$$H_2O+Br_2 \rightarrow HBr+HBrO$$

The HBrO thus formed is a strong oxidizing agent, and attacks the activated carbon present in the reaction system to generate carbon dioxide as shown by the following formula:

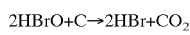

$$2HBrO+C \rightarrow 2HBr+CO_2$$

Accordingly, the amount of generated carbon dioxide as a measure of the durability of the activated carbon was examined. That is, the durability of the activated carbon is thought to be higher when the amount of generated carbon dioxide is less.

Each of the activated carbon materials prepared in Examples 1 to 7 was used in an amount corresponding to 0.5 g of the activated carbon prior to forming the film.

Each of them was placed in an autoclave together with 16 g of bromine and 84 g of water, and the autoclave was evacuated. The reaction mixture was heated at 140° C. for 1 hour, and cooled to room temperature, followed by collecting the gas generated and analyzing it by gas chromatography. Table 1 shows the concentration of HBr thus formed and the amounts of generated $CO_2$ and $O_2$ in the reactions. In addition, since the vapor pressure of bromine is high, the generated gas was cooled to −10° C., and the amount of generated gas was calculated from the pressure difference. Base activated carbon on which a film was not formed was used for comparison.

TABLE 1

| Type of activated carbon | Concentration of HBr formed (mol/l) | Amount of generated $CO_2$ gas (ml) | Amount of generated $O_2$ gas (ml) | $CO_2/O_2$ |
|---|---|---|---|---|
| Base | 0.75 | 350 | 38 | 9.2 |
| Example 1 | 0.75 | 90 | 300 | 0.3 |
| Example 2 | 0.70 | 84 | 280 | 0.3 |
| Example 3 | 0.5 | 87 | 173 | 0.5 |
| Example 4 | 0.4 | 101 | 106 | 0.95 |
| Example 5 | 0.25 | 63 | 66 | 0.95 |
| Example 6 | 0.35 | 28 | 154 | 0.18 |
| Example 7 | 0.3 | 16 | 140 | 0.11 |

It is clear from Table 1 that since the activated carbon of the present invention has an oxidation-resistant, heat-resistant film formed thereon, it is stabilized even in the water decomposition reaction at a temperature as high as 140° C., that it is not oxidized by HBrO and consequently it generates less $CO_2$ than the base activated carbon, and that it has high durability. In particular, it can be seen that since the amount of HBr formed when the activated carbon prepared in Example 1 is used is approximately the same as that of HBr formed when the base activated carbon is used, the catalytic activity of the activated carbon in Example 1 is not impaired. Although the amount of HBr formed in Examples 6 and 7 is less than that of HBr formed when the base activated carbon is used, the ratio of $CO_2/O_2$ is less. That is, the amount of generated $CO_2$ is less. That is, the activated carbon in Examples 6 and 7 is not deteriorated, and $O_2$ is generated in a large amount. That is, the effect of decomposing HBrO is powerful.

EXAMPLE 8
Imparting water repellence to a film Tetraethyl orthosilicate in an amount of 10.0 g, FAS ($CF_3(CF_2)_7CH_2CH_2Si(OCH_3)_3$) in an amount of 2.73 g and ethyl alcohol in an amount of 13.27 g were mixed, and the mixture was stirred for 2 hours. To the mixture, 4.25 g of pure water and 5.27 g of 0.1N HCl were further added, and the mixture was stirred for 2 hours. The resultant mixture was allowed to stand for 24 hours, and activated carbon fibers having a fiber diameter of 10 μm were immersed therein and pulled out. The activated carbon fibers were dried by allowing them to stand at 40° C. for 30 minutes, followed by baking them at 200° C. for 1 hour. The $SiO_2$ film thus formed had a thickness of 300 nm. The specific surface area of the activated carbon was measured by a BET before and after coating the activated carbon. The activated carbon had a specific surface area of 1,200 m²/g before coating and 1,180 m²/g after coating, that is, the activated carbon showed substantially no change of the specific surface area before and after coating. As described above, water-repellent carbon can be utilized in the gas diffusion layer of the gas diffusion electrodes of fuel cells. A carbon powder to which a fluororesin is added to enhance the water repellence has been used for conventional gas diffusion layers. However, when the amount of the added fluororesin is increased, the electric resistance is increased. Accordingly, there is a limitation on imparting water repellence to activated carbon by the addition of a fluororesin. The water repellence of activated carbon can be increased without lowering the electric resistance by the use of the activated carbon obtained in Example 8. Moreover, the method is not restricted to activated carbon, but it can be applied to zeolite to increase the durability without lowering the specific surface area.

We claim:

1. A method of decomposing water to produce a hydrogen halide and oxygen by reacting water with a halogen as represented by the chemical equations:

$$H_2O + X_2 \rightarrow HX + HXO \qquad (1)$$

$$HXO \rightarrow HX + \tfrac{1}{2}O_2 \qquad (2)$$

wherein X is a halogen, in the presence of an activated carbon catalyst, and wherein the activated carbon is coated with a heat-resistant, oxidation-resistant film.

2. The method according to claim 1, wherein the heat-resistant, oxidation-resistant film is formed from an inorganic material.

3. The method according to claim 1, wherein the heat-resistant, oxidation-resistant film is formed from an organic material.

4. The method according to claim 1, wherein the heat-resistant, oxidation-resistant film is formed from one or more materials.

5. The method according to claim 1, wherein the heat-resistant, oxidation-resistant film is a single layer or a multilayer structure having at least two layers.

6. The method according to claim 2, wherein the inorganic material is ceramic or metal.

7. The method according to claim 3, wherein the organic material is one or more resins selected from organic ion-exchange resins, silicone resins and fluororesins.

8. The method according to claim 3, wherein the film contains an oxide that decomposes hypohalogenous acid.

9. The method according to claim 8, wherein the oxide that decomposes hypohalogenous acid is one or more oxides selected from oxides of Mn, Fe or W.

10. The method according to claim 1, wherein the heat-resistant, oxidation-resistant film has water repellence.

* * * * *